United States Patent
Katoh et al.

(10) Patent No.: US 8,137,038 B2
(45) Date of Patent: Mar. 20, 2012

(54) MACHINING METHOD, PROGRAM, MACHINING-PROGRAM GENERATING PROGRAM AND MACHINING APPARATUS OF PRESS DIE

(75) Inventors: Kouichi Katoh, Numazu (JP);
Takamasa Itoh, Shimizu-Cho (JP);
Yoshiaki Mikami, Chuo-Ku (JP);
Norihiro Miyazawa, Chuo-Ku (JP);
Hirofumi Shinohara, Fuji (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 654 days.

(21) Appl. No.: 12/276,441

(22) Filed: Nov. 24, 2008

(65) Prior Publication Data
US 2009/0133461 A1 May 28, 2009

(30) Foreign Application Priority Data
Nov. 26, 2007 (JP) ................................. 2007-304766

(51) Int. Cl.
*B23C 3/00* (2006.01)
*B23C 3/12* (2006.01)
(52) U.S. Cl. .......... 409/80; 409/138; 409/132; 409/190; 409/219; 700/187
(58) Field of Classification Search .......... 409/131–132, 409/138, 143, 79–80, 199, 191, 190, 189, 409/205, 219, 225; 76/107.1; 700/159, 187
See application file for complete search history.

(56) References Cited

U.S. PATENT DOCUMENTS

| | | | | |
|---|---|---|---|---|
| 2,376,724 A | * | 5/1945 | Rice | 29/558 |
| 3,811,163 A | * | 5/1974 | Frederick et al. | 409/132 |
| 4,104,943 A | * | 8/1978 | Calderoni | 409/191 |
| 4,121,817 A | * | 10/1978 | Pavlovsky | 269/296 |
| 4,648,761 A | * | 3/1987 | Mitchell et al. | 409/132 |
| 4,929,131 A | * | 5/1990 | Allemann | 409/132 |
| 4,946,321 A | * | 8/1990 | Allemann | 409/132 |
| 6,929,435 B2 | * | 8/2005 | Stelson et al. | 409/132 |

FOREIGN PATENT DOCUMENTS

| | | | |
|---|---|---|---|
| JP | 09-029697 A | * | 2/1997 |
| JP | 10-277883 A | * | 10/1998 |
| JP | 2006-192485 | | 7/2006 |

OTHER PUBLICATIONS

English Abstract from Japanese Patent Office for JP-2006-192485, which JP '485 was published Jul. 27, 2006.* English language translation of JP 2006-192485, which JP '485 was published Jul. 2006.

* cited by examiner

*Primary Examiner* — Erica E Cadugan
(74) *Attorney, Agent, or Firm* — DLA Piper LLP US

(57) ABSTRACT

A machining method of a press die having a pierce cutter and a secondary relief-clearance area recessed inward relative to a profile of the pierce cutter is provided. A plunge cutting tool having a tool body and at least one edge portion provided on an outer circumference of an end of the tool body is used, the edge portion being protruding from the outer circumference of the tool body and being capable of carving while rotating around an axis of the tool body and moving in an axial direction of the tool body. While rotating the plunge cutting tool with an axis of the tool body being approximately parallel to a surface of the pierce cutter, the plunge cutting tool is relatively moved along the profile of the pierce cutter. The plunge cutting tool is also relatively moved in the axial direction of the tool body along the shape of the pierce cutter and the secondary relief-clearance area in a piercing direction each time the plunge cutting tool is relatively moved by a predetermined pitch.

2 Claims, 13 Drawing Sheets

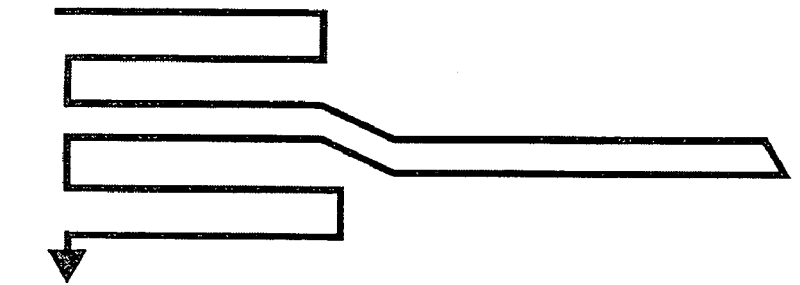
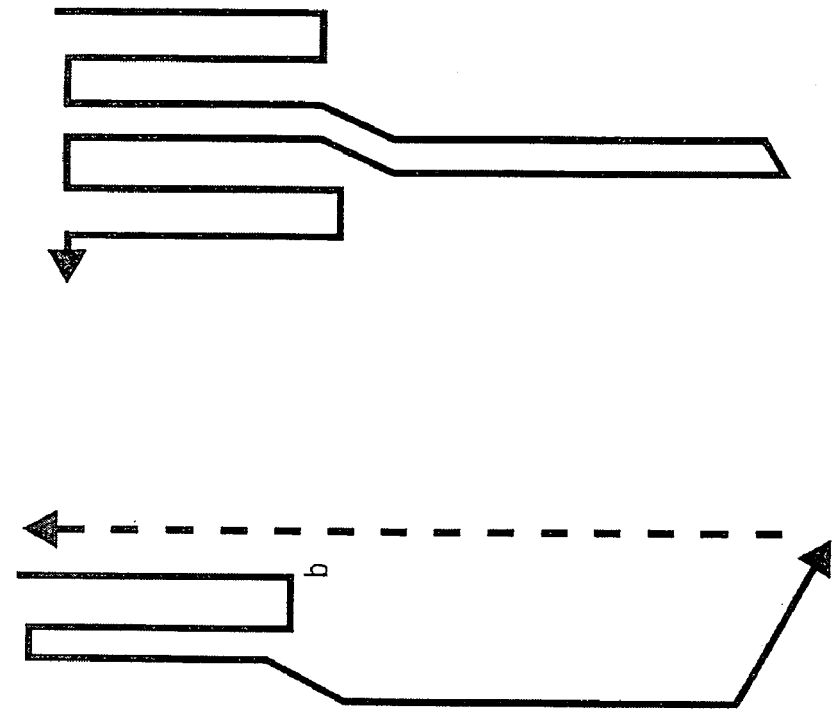
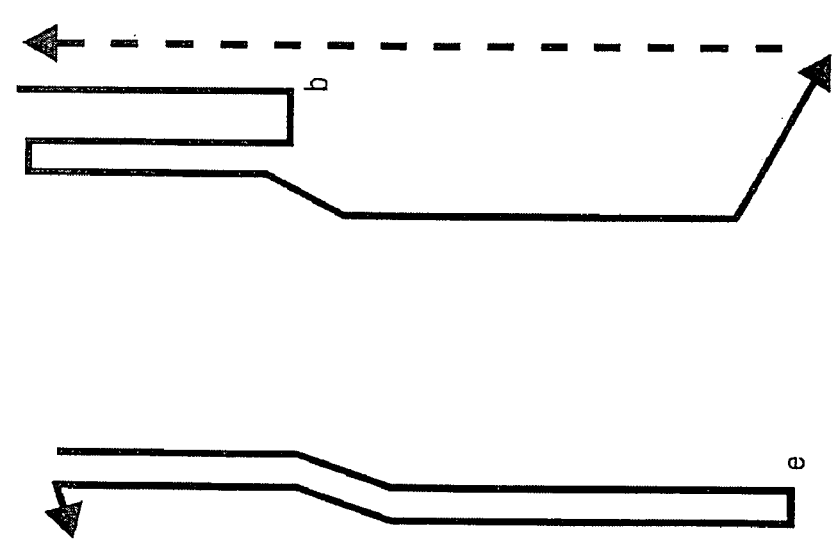
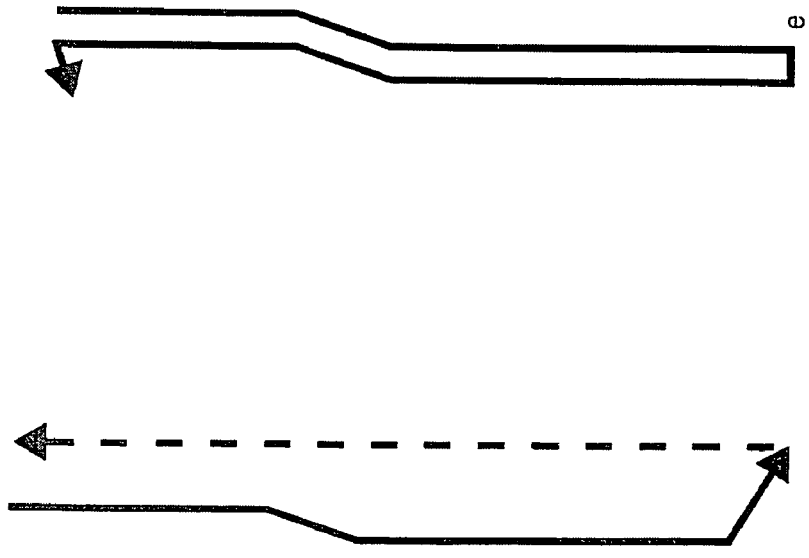

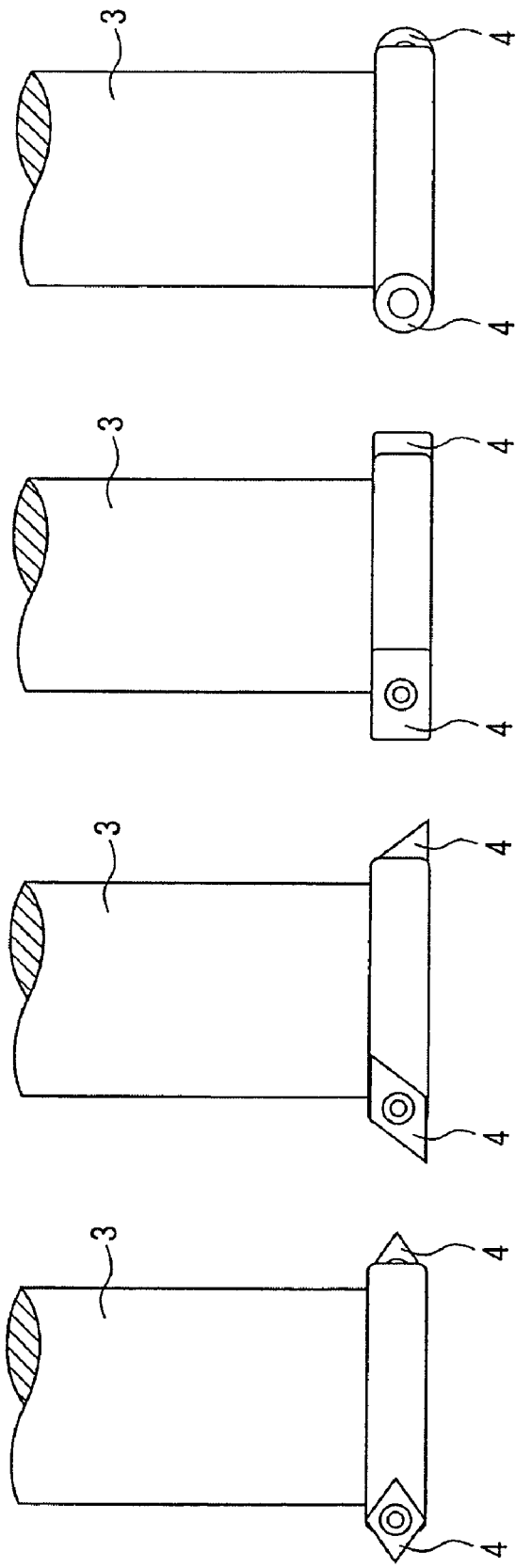

PIERCING DIRECTION

US 8,137,038 B2

MACHINING METHOD, PROGRAM, MACHINING-PROGRAM GENERATING PROGRAM AND MACHINING APPARATUS OF PRESS DIE

BACKGROUND OF THE INVENTION

1. Field of the Invention

The present invention relates to a machining method, a program, a machining-program generating program and a machining apparatus of a press die.

2. Description of Related Art

As shown in FIG. 11, a press die for, for instance, punching a vehicle door includes a pierce cutter B formed along an outer circumference of a die body and a secondary relief-clearance area C recessed inward relative to the profile of the pierce cutter B, the pierce cutter B and the secondary relief-clearance area C being arranged in a piercing direction. The secondary relief-clearance area C is provided so that punched piece punched by the pierce cutter B is not hooked on the press die.

Traditionally, in order to machine such a press die, the entire process is divided into two steps, i.e. machining of the pierce cutter B and machining of the secondary relief-clearance area C.

When the pierce cutter B is to be machined, as shown in FIG. 12, a flat-end mill is used as a machining tool, which is moved along a profile line of the pierce cutter B to carve the outer circumference of a press die material W, leaving a finishing margin (approximately 0.5 to 1.0 mm) from the profile line of the pierce cutter B (coarse machining).

During the machining of the secondary relief-clearance area C, as shown in FIG. 13, a T-shaped tool (T-shaped tool provided with a short cylindrical blade on an end of a tool shaft) is used as a machining tool, which is moved along the profile line and is moved up and down by an operator while defining the pierce cutter B to machine the secondary relief-clearance area C.

Incidentally, as an alternative method for machining the secondary relief-clearance area without using the T-shaped tool shown in FIG. 13, it is proposed to use a carving tool having a tapered end-mill portion, a ball-end mill or a carving tool having a spherical end-mill portion at an end thereof to machine the secondary relief-clearance area of a press die (See Document 1: JP-A-2006-192485).

After completion of the above machining, i.e. after completion of the coarse machining of the pierce cutter B and the machining of the secondary relief-clearance area C, finish machining is conducted on the pierce cutter B.

During the finish machining, as shown in FIG. 14, the coarsely machined pierce cutter B is carved with a flat-end mill for about 0.5 to 1.0 mm to finish the pierce cutter B. Subsequently, as shown in FIG. 15, the pierce cutter B is tapered (relief cutting) except for an effective blade B1 at an end (approximately 2 mm) to provide a blade relief-clearance area B2.

In the traditional machining methods, it is proposed to machine the secondary relief-clearance area with various tools, all employing two stages, i.e. machining of the pierce cutter and machining of the secondary relief-clearance area. Since different types of tools are used in the respective steps, labor and cost are required for exchanging the tools, resulting in poor efficiency.

Especially, since the machining of the secondary relief-clearance area requires that an operator manually moves the T-shaped tool up and down while defining the pierce cutter to machine the secondary relief-clearance area while leaving the portion corresponding to the pierce cutter, skilled work is necessary and some degree of danger is accompanied.

It is conceivable that the pierce cutter and the secondary relief-clearance area are machined successively conducted with a single tool of elaborated configuration, which, however, requires larger tool length. Then, on account of resistance received by the tool during carving, the tool is bowed away from the workpiece. Accordingly, considering the flexure of the tool, multiple separate carving processes with slight carving amount are required, so that significant reduction of machining time cannot be expected.

SUMMARY OF THE INVENTION

An object of the present invention is, in view of the above disadvantages, to provide a machining method of a press die capable of significantly reducing a machining time.

Another object of the invention is to provide a machining program, a machining-program generating program and a machining apparatus capable of significantly reducing a machining time without requiring a worker's skill and without accompanying dangerous work.

A machining method of a press die having a pierce cutter and a secondary relief-clearance area recessed inward relative to a profile of the pierce cutter, the pierce cutter and the secondary relief-clearance area being arranged in a piercing direction, the method includes: a providing step for providing a machining tool having a tool body and at least one edge portion provided on an outer circumference of an end of the tool body, the edge portion being protruding from the outer circumference of the tool body and being capable of carving while rotating around an axis of the tool body and moving in an axial direction of the tool body; a relative movement step, in which the machining tool and the press-die material are relatively moved along the profile of the pierce cutter while rotating the machining tool with the axis of the tool body of the machining tool being approximately parallel to a surface of the pierce cutter; and a plunge cutting step during the relative movement step, in which the machining tool and the press-die material are relatively moved in the axial direction of the tool body along a shape of the pierce cutter and the secondary relief-clearance area in the piercing direction each time the machining tool and the press-die material are relatively moved by a predetermined pitch.

According to the above aspect of the invention, the machining tool having the tool body and the at least one edge portion provided on the outer circumference of the end of the tool body, the edge portion being protruding from the outer circumference of the tool body and being capable of carving while rotating around the axis of the tool body and moving in the axial direction of the tool body, is used to conduct the relative movement step and the plunge cutting step.

In the relative movement step, the machining tool and the press-die material are relatively moved along the profile of the pierce cutter while rotating the machining tool with the axis of the tool body of the machining tool being approximately parallel to the surface of the pierce cutter. In the plunge cutting step during the relative movement step, the machining tool and the press-die material are relatively moved in the axial direction of the tool body along the shape of the pierce cutter and the secondary relief-clearance area in the piercing direction each time the machining tool and the press-die material are relatively moved by the predetermined pitch.

In other words, since the plunge cutting tool provided with the at least one edge portion protruding from the outer circumference of the tool body and capable of carving during rotation around the axis of the tool body and the axial movement of the tool body at the end of the outer circumference of the tool body is used to carve the die, carving resistance can be reduced as compared with carving using a flat-end mill.

Further, since the machining tool and the press-die material are relatively moved in the axial direction of the machining tool along the shape of the pierce cutter and the secondary relief-clearance area in the piercing direction as well as the relative movement step for relatively moving the machining tool and the press-die material along the profile of the pierce cutter while rotating the machining tool, a process that conventionally required two steps can be conducted in one step.

At this time, the machining tool is not only relatively moved along the profile of the pierce cutter while being rotated but also is relatively moved in the axial direction of the tool body along the shape of the pierce cutter and the secondary relief-clearance area in the piercing direction, so that the flexure of the tool body can be reduced. Accordingly, carving amount can be increased, thus contributing significant reduction of the machining time.

In the machining method of a press die of the above aspect of the invention, the plunge cutting step preferably includes: a pierce-cutter plunge cutting step for relatively moving the machining tool and the press-die material in the axial direction of the tool body to machine the pierce cutter; a cutting step for relatively moving the machining tool and the press-die material in a direction orthogonal to the axial direction of the tool body to have the machining tool cut into the secondary relief-clearance area; and a secondary relief-clearance area plunge cutting step for relatively moving the machining tool and the press-die material in the axial direction of the tool body to machine the secondary relief-clearance area.

According to the above arrangement, during the plunge cutting step, the plunge cutting tool and the press-die material are relatively moved in the axial direction of the tool body to machine the pierce cutter and are relatively moved in the direction orthogonal to the axial direction of the tool body to have the machining tool cut into the secondary relief-clearance area. Subsequently, the machining tool is relatively moved in the axial direction of the tool body to machine the secondary relief-clearance area. Accordingly, the machining from the pierce cutter to the secondary relief-clearance area can be continuously conducted.

In the machining method of a press die of the above aspect of the invention, it is preferable that the pierce cutter of the press die includes an effective blade and a blade relief-clearance area that is gradually recessed inward in an inclined manner relative to the profile of the effective blade as extending from the effective blade to the secondary relief-clearance area, and, in the pierce-cutter plunge cutting step, after the machining tool and the press-die material are relatively moved in the axial direction of the tool body to machine the effective blade, the machining tool and the press-die material are relatively moved in the axial direction of the tool body and are moved in a direction orthogonal to the axial direction to machine the blade relief-clearance area.

According to the above arrangement, in the pierce-cutter plunge cutting step, after the machining tool and the press-die material are relatively moved in the axial direction of the tool body to machine the effective blade, the machining tool and the press-die material are relatively moved in the axial direction of the tool body and also are moved in the direction orthogonal to the axial direction to machine the blade relief-clearance area. Accordingly, the effective blade and the blade relief-clearance area can be successively machined on the pierce cutter of the press-die material. Hence, the number of the machining steps can be reduced and time reduction becomes possible. In a conventional arrangement, since the machining of the blade relief-clearance area is conducted with a grinder and the like by an operator, work efficiency is extremely low. However, according to the invention, the above disadvantage can also be significantly mitigated.

In the machining method of a press die of the above aspect of the invention, a finish-machining step for finishing the pierce cutter machined in the plunge cutting step with an end mill is preferably provided.

According to the above arrangement, since the pierce cutter machined during the plunge cutting step is finished with an end mill, the shear surface of the punched product can be favorably finished.

A machining program according to another aspect of the invention executes the above machining method with a machining apparatus provided with a controller.

According to the above aspect of the invention, the same advantages as the above-described machining method can be expected.

A machining-program generating program according to still another aspect of the invention is for generating a machining program for machining a press die with a machining tool, the press die having a pierce cutter and a secondary relief-clearance area recessed inward relative to a profile of the pierce cutter, the pierce cutter and the secondary relief-clearance area being arranged in a piercing direction, the machining-program generating program including.: an acquiring process for acquiring profile data of the pierce cutter and a parameter for the machining tool and a portion of the press die to be machined; a relative-movement path calculating process for calculating a relative movement path for relatively moving the machining tool and the press-die material along the profile based on the profile data and a shape of the machining tool; and a plunge-cutting path calculating process for calculating a plunge cutting path for relatively moving the machining tool and the press-die material along a shape of the pierce cutter and the secondary relief-clearance area in the piercing direction for each predetermined pitch on the relative movement path.

According to the above aspect of the invention, when the profile data of the pierce cutter, the machining tool and the parameters relating to the portion of the press die to be machined are inputted and are incorporated, the relative movement path for relatively moving the machining tool and the press-die material along the profile of the pierce cutter based on the profile data and the shape of the machining tool, and the plunge cutting path for relatively moving the machining tool and the press-die material along the shape of the pierce cutter and the secondary relief-clearance area in the piercing direction for every predetermined pitch of the relative movement path are obtained. Accordingly, the machining program for machining the press die with the machining tool can be automatically created. With the use of the machining program generated thereby for machining the press-die material, the above-described advantages can be expected.

A machining apparatus according to further aspect of the invention is for a press die having a pierce cutter and a secondary relief-clearance area recessed inward relative to a profile of the pierce cutter, the pierce cutter and the secondary relief-clearance area being arranged in a piercing direction, the apparatus including: a three-dimensional drive mechanism including a machining tool and a spindle head for rotatably supporting the machining tool, the three-dimensional drive mechanism relatively moving the spindle head and a press-die material three-dimensionally; and a controller for controlling an operation of the three-dimensional drive mechanism, wherein the machining tool has a tool body and at least one edge portion provided on an outer circumference of an end of the tool body, the edge portion being protruding from the outer circumference of the tool body and being capable of carving while rotating around an axis of the tool body and moving in an axial direction of the tool body, and the controller has a unit for executing: a relative movement step, in which the machining tool and the press-die material are relatively moved along the profile of the pierce cutter while rotating the machining tool with the axis of the tool body of the machining tool being approximately parallel to a surface of the pierce cutter; and a plunge cutting step during the relative movement step, in which the machining tool and the press-die material are relatively moved in the axial direction of the tool body along a shape of the pierce cutter and the secondary relief-clearance area in the piercing direction each time the machining tool and the press-die material are relatively moved by a predetermined pitch.

According to the above aspect of the invention, the controller executes: the relative movement step, in which the machining tool and the press-die material are relatively moved along the profile of the pierce cutter while the machining tool is rotated; and the plunge cutting step, in which the machining tool and the press-die material are relatively moved in the axial direction of the tool body along the shape of the pierce cutter and the secondary relief-clearance area in the piercing direction. Accordingly, significant reduction of machining time can be attained and, since it is not required for an operator to relatively move the machining tool and the press-die material, the machining process can be conducted without skilled work and with safety.

In the machining apparatus of a press die of the above arrangement, it is preferable that the press-die material is supported on a workpiece mount face via a leg of a predetermined height, and the controller includes a unit for executing the relative movement step and the plunge cutting step considering height information of the leg.

When the press-die material is directly placed on the workpiece mount face, the bottom side of the press-die material, i.e. a portion adjacent to the workpiece mount face cannot be machined. Since the press-die material is supported on the table via the leg of the predetermined height, the bottom side of the press-die material can also be machined. At this time, by inputting the height information of the legs in advance, the controller executes the relative movement step and the plunge cutting step considering the height information of the legs, so that predetermined machining can be conducted on all of the sides without requiring additional effort.

BRIEF DESCRIPTION OF THE DRAWINGS

FIGS. 9A to 9D are illustrations for showing other examples of the machining paths.

FIGS. 10A to 10D are illustrations for showing other examples of the machining tools.

DETAILED DESCRIPTION OF PREFERRED EMBODIMENT(S)

Figure 1:
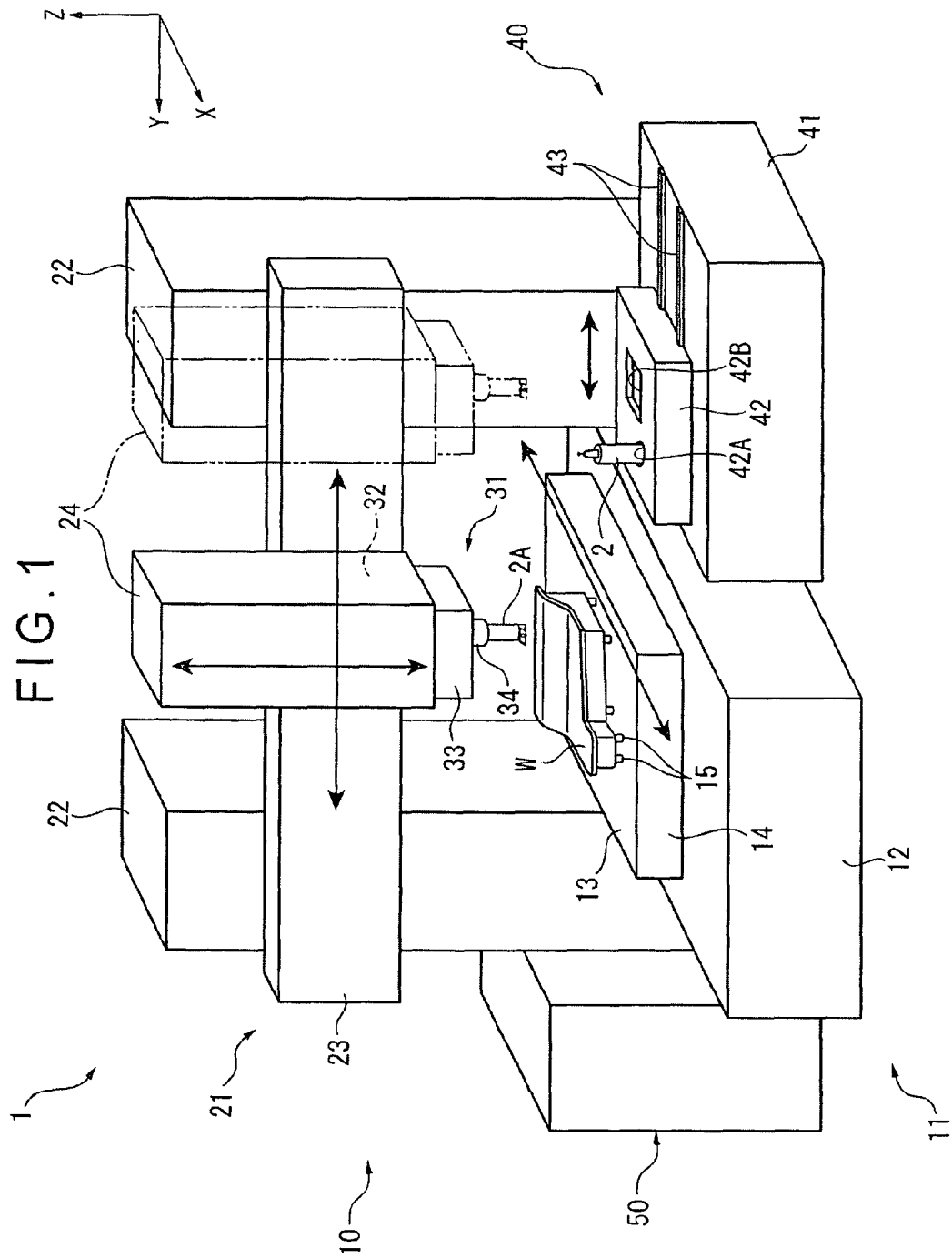
FIG. 1 is a perspective view showing an outline of a machining apparatus according to an embodiment of the invention.
Figure 2:
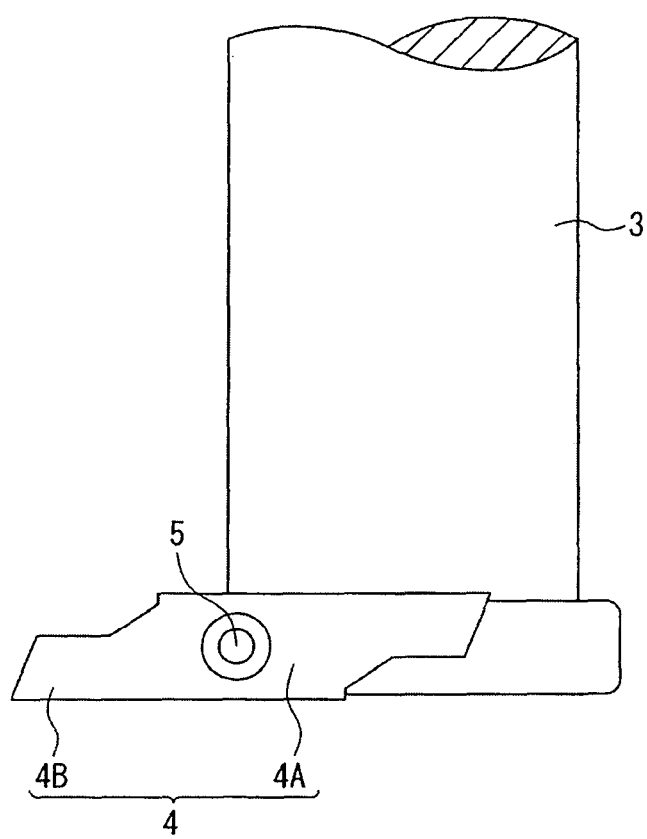
FIG. 2 is a front elevational view showing a machining tool used for the machining apparatus.
Figure 3:
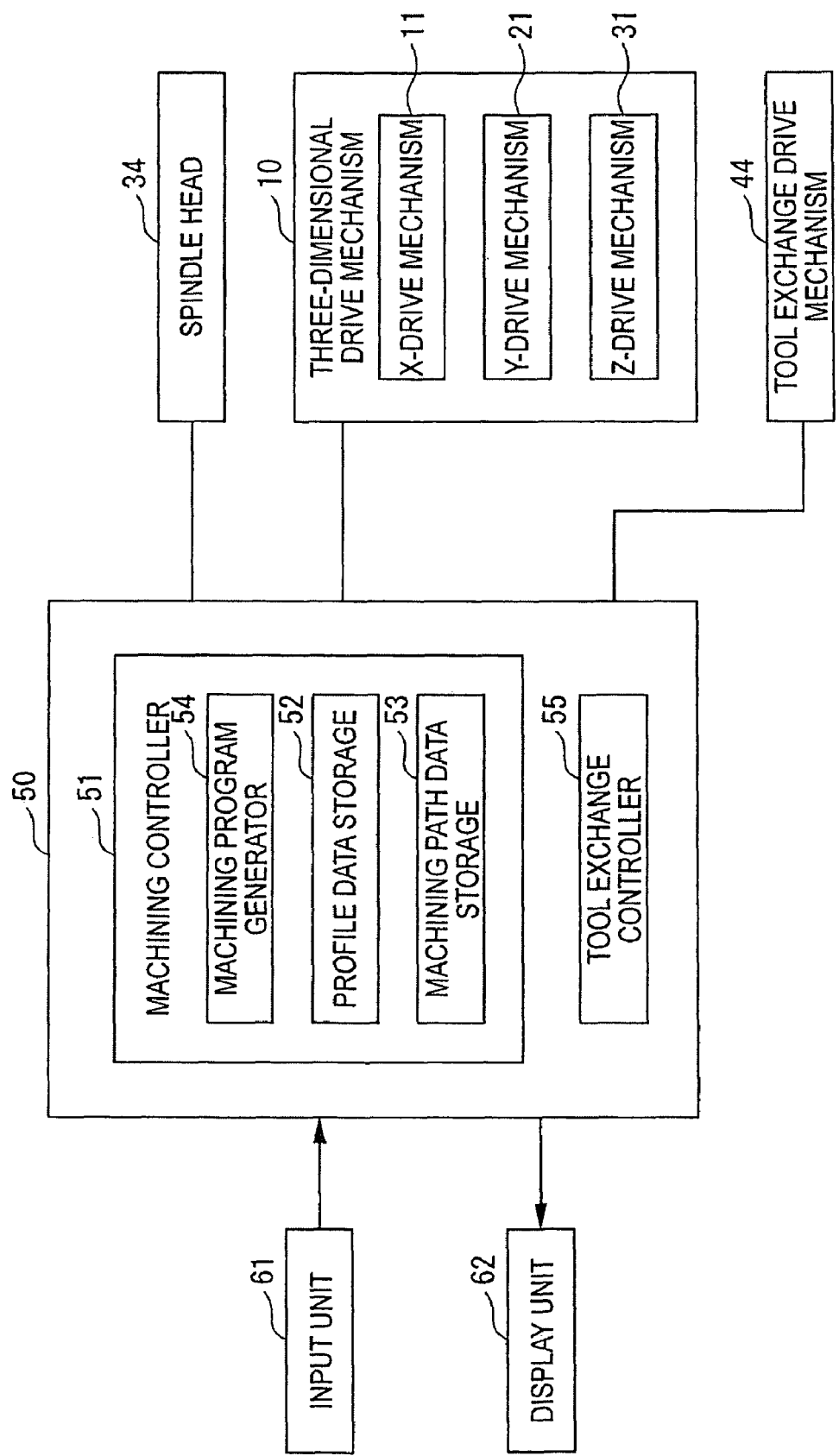
FIG. 3 is a block diagram showing a controller of the above machining apparatus.

An embodiment of the present invention will be described below with reference to the attached drawings.
Explanation of Machining Apparatus FIG. 1 is a perspective view showing an outline of a machining apparatus according to an embodiment of the invention. FIG. 2 is a front elevational view showing a plunge cutting tool used for the machining apparatus. FIG. 3 is a block diagram showing an outline of a controller.

As shown in FIG. 1, a machining apparatus 1 is a so-called portal machining center, which includes machining tools 2A and 2, a spindle head 34 that rotatably supports the machining tools 2A and 2, a three-dimensional drive mechanism 10 for relatively moving the spindle head 34 and a press-die material W in a three-dimensional direction, a tool exchanger 40 and a controller 50 for controlling the operation of the spindle head 34, the three-dimensional drive mechanism 10 and the tool exchanger 40.

The three-dimensional drive mechanism 10 includes: an X-drive mechanism 11 having an X-drive axis extending along an X-direction in a horizontal plane; a Y-drive mechanism 21 having a Y-drive axis extending along a Y-direction orthogonal to X-direction in the horizontal plane; and a Z-drive mechanism 31 having a Z-drive axis extending along a Z-direction orthogonal to the X-direction and Y-direction.

The X-drive mechanism 11 includes an X-drive guide shaft 12 extending along the X-direction and an X-slider 14 slidably guided by the X-drive guide shaft 12 and provided with a workpiece mount face 13 on an upper side thereof. The press-die material W (workpiece) is mounted at a predetermined height from the workpiece mount face 13 via a plurality of legs 15.

The Y-drive mechanism 21 includes: two columns 22 erected on both Y-direction sides of the X-drive mechanism 11; a Y-drive guide shaft 23 bridging the columns 22 in the Y-direction at a predetermined height from the X-slider 14; and a Y-slider 24 slidably guided along the Y-drive guide shaft 23.

The Z-drive mechanism 31 includes: a Z-drive guide shaft 32 provided along the Z-direction on an inner circumference of the Y-slider 24, the Y-slider 24 having a cylindrical arrangement with a cylinder axis extending in the Z-direction; and a Z-slider 33 guided along the Z-drive guide shaft 32 in a manner slidable toward the press-die material W mounted on the X-slider 14.

A spindle head 34 that detachably holds the machining tools 2A and 2 and rotates the machining tools 2A and 2 is provided on the lower end of the Z-slider 33.

The respective drive mechanisms 11, 21 and 31 are respectively provided with a power source (not shown) and a power transmission mechanism (not shown) for transferring a power of the power source to the sliders. The power source is controlled by the controller 50. Then, the power of the power source is transmitted to the respective sliders 14, 24, 33 by the power transmission mechanism to move the sliders 14, 24, 33. Incidentally, various motors such as a linear motor and a motor having a rotor may be used as the power source. Examples of the power transmission mechanism include: a mechanism in which a slide piece of a linear motor is attached to the sliders 14, 24, 33; and a mechanism in which a ball screw connected to a rotor is screwed to the sliders 14, 24, 33.

The tool exchanger 40 is provided at a corner formed by the X-drive guide shaft 12 and the one of the columns 22. The tool exchanger 40 includes: approximately rectangular parallelepiped body 41; a tool holder table 42 provided on an upper side of the body 41; a pair of exchange guide rails 43 provided on the upper side of the body 41 to guide the movement of the tool holder table 42 in a direction toward and away from (±Y direction) the X-drive guide shaft 12; and a tool exchange drive mechanism 44 (see FIG. 3) for driving the tool exchanger 40.

The tool holder table 42 is provided with a plurality of tool holders 42A and 42B. The tool holders 42A and 42B are located below a movement locus of the Y-slider 24. The tool exchange drive mechanism 44 moves the tool holder table 42 as necessary to allow an exchange of the machining tools 2 on the spindle head 34 and the tool holder table 42.

Among the machining tools, the plunge cutting tool 2A used for coarse machining of the press-die material W includes, as shown in FIG. 2, a tool body 3 detachably attached to the spindle head 34 and a blade tip 4 detachably attached to the end of the tool body 3 via a stopper 5.

The blade tip 4 has an edge portion 4B that projects from the outer circumference of the tool body 3, the edge portion 4B being capable of carving when being rotated around an axis of the tool body 3 and when being moved in an axial direction of the tool body 3. Specifically, the blade tip 4 includes: a plate-shaped fixed portion 4A of a predetermined thickness that is detachably attached to the tool body 3 by the stopper 5; and the edge portion 4B tapered from the fixed portion 4A, the edge portion 4B protruding from the outer circumference of the tool body 3 by approximately 3 to 5 mm.

As shown in FIG. 3, an input unit 61 and a display unit 62 are connected to the controller 50. Also, the spindle head 34, the three-dimensional drive mechanism 10 and the tool exchange drive mechanism 44 are electrically coupled to the controller 50. The controller 50 includes a machining controller 51 and a tool exchange controller 55.

The machining controller 51 includes a machining program generator 54, a profile data storage 52 and a machining path data storage 53. When data on a profile line, machining tool data and various parameters relating to the shape of the press die are inputted from the input unit 61 by an operator, the machining program generator 54 stores the data and parameters in the profile data storage 52. Further, based on the data and the various parameters of the profile line stored in the profile data storage 52, a machining path of the machining tools 2A, 2 is calculated and the machining path data is stored in the machining path data storage 53. In other words, the machining path data is obtained by: calculating a relative movement path for relatively moving the machining tool and the press-die material along the profile line based on the profile line data and the shape of the machining tool; and calculating a plunge cutting path for relatively moving the machining tool and the die material along the profile of the pierce cutter B and the secondary relief-clearance area C in the piercing direction for every predetermined pitch on the relative movement path. The obtained machining path data is stored in the machining path data storage 53.

Based on the machining path data stored in the machining path data storage 53, the drive of the three-dimensional drive mechanism 10 is controlled to machine the press die.

Further, the machining controller 51 has a unit that, when height information of the legs 15 is inputted from the input unit 61, stores the height information of the legs 15 and, considering the height information of the legs 15, executes below-described relative movement step and plunge cutting step. In other words, the machining controller 51 is provided with a function that corrects the machining path data by adding the height information of the legs 15 to Z-coordinate value of the respective coordinate values of the machining path data and machines the press die using the corrected machining path data.

Explanation of Machining Method of Press Die

Figure 4:
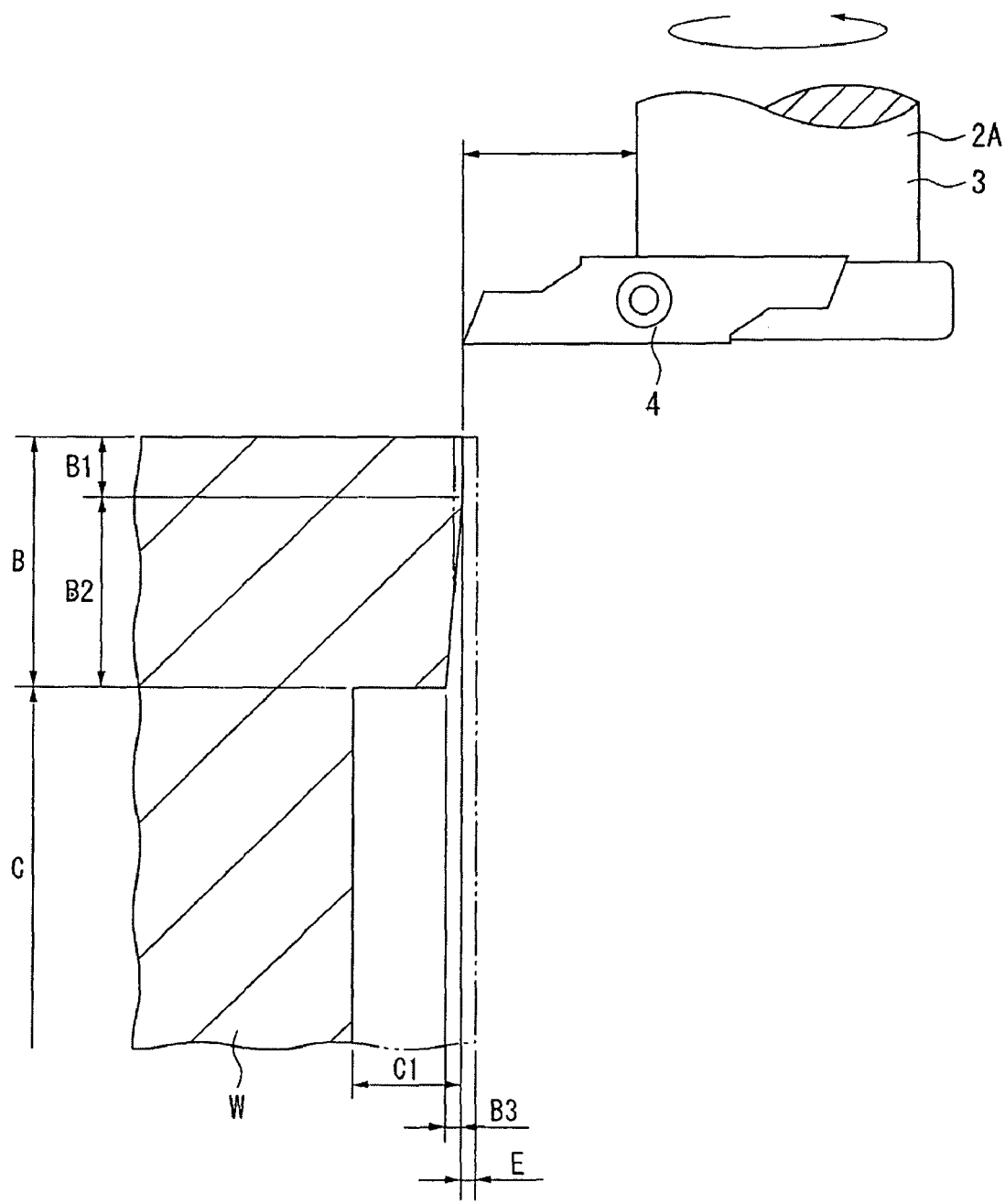
FIG. 4 is an illustration showing a coarse machining in the above embodiment.
Figure 5:
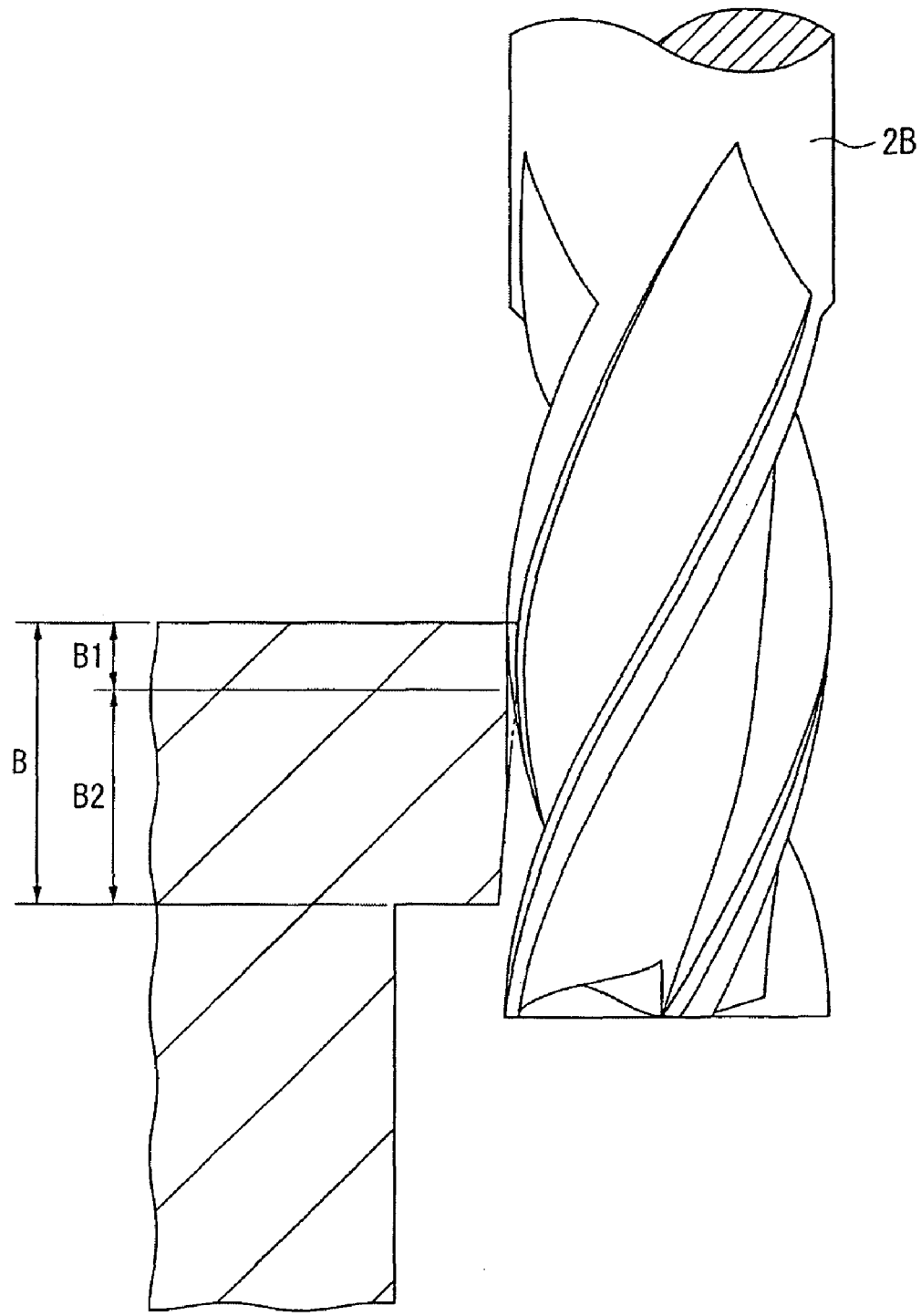
FIG. 5 is an illustration showing a finish machining in the above embodiment.

In order to machine the press die, the coarse machining step for coarsely machining the pierce cutter B and the secondary relief-clearance area C on the outer circumference of the press-die material W using the plunge cutting tool 2A is initially conducted as shown in FIG. 4. Subsequently, a flat-end mill 2B is used to conduct the finish-machining step to finish the pierce cutter B as shown in FIG. 5.

The pierce cutter B is typically sized at 15 to 20 mm and includes an effective blade B1 (approximately 2 mm) and the blade relief-clearance area B2 gradually recessed inward in an inclined manner relative to the profile of the effective blade B1 as extending from the effective blade B1 toward the secondary relief-clearance area C. A slant-area relief-clearance value B3 of the blade relief-clearance area B2 is typically approximately 0.5 to 1 mm. A secondary escape amount C1 of the secondary relief-clearance area C is typically approximately 2 mm.

During the coarse machining: a relative movement step for, while rotating the plunge cutting tool 2A with the axis of the tool body 3 of the plunge cutting tool 2A being approximately parallel to the surface of the pierce cutter B (surface of the effective blade B1), relatively moving the plunge cutting tool 2A and the press-die material W along the profile of the pierce cutter B; and a plunge cutting step for, during the relative movement step, moving the plunge cutting tool 2A in the axial direction of the tool body 3 along the profile of the pierce cutter B and the secondary relief-clearance area C in the piercing direction each time-the plunge cutting tool 2A and the press-die material W are relatively moved for every predetermined pitch, are conducted.

Figure 6:
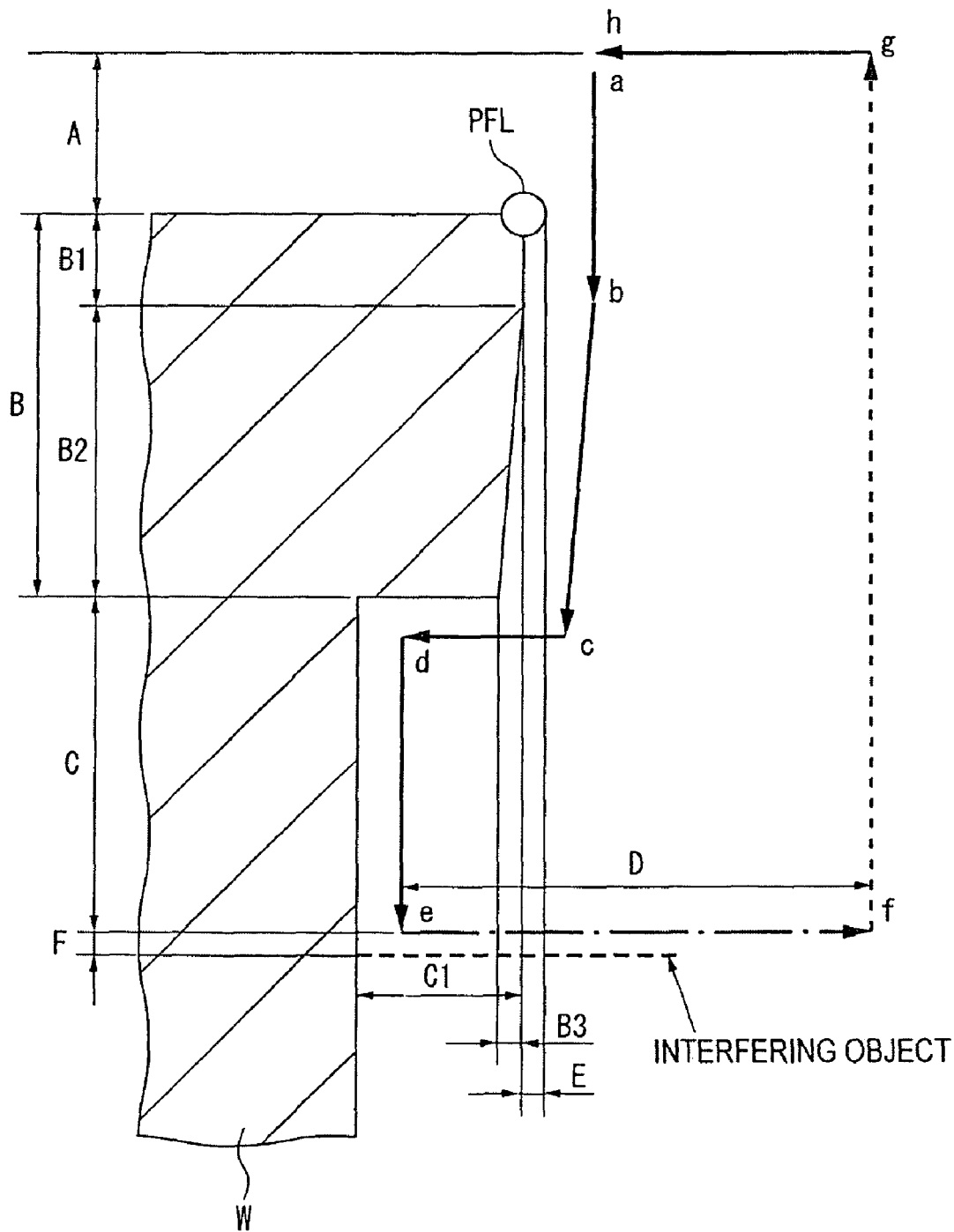
FIG. 6 is an illustration showing a machining path of the machining tool in the above embodiment.

Specifically, each time the plunge cutting tool 2A and the press-die material W are relatively moved by the predetermined pitch along the profile line of the pierce cutter B, the plunge cutting tool 2A is moved along a machining path that passes points a, b, c, d, e, f, g and h (identical with the point a) as shown in FIG. 6.

In other words, during the plunge cutting step, the following steps are sequentially conducted: a pierce-cutter plunge cutting step (a path from the point a to the point c), in which the plunge cutting tool 2A is relatively moved in the axial direction of the tool body 3 to machine the pierce cutter B; a cutting step (a path from the point c to the point d), in which the plunge cutting tool 2A and the press-die material W are relatively moved in a direction orthogonal to the axial direction of the tool body 3 so that the plunge cutting tool 2A cuts into the secondary relief-clearance area C; a secondary relief-clearance area plunge cutting step (a path from the point d to the point e), in which the plunge cutting tool 2A is relatively moved in the axial direction of the tool body 3 to machine the secondary relief-clearance area; a retreat step (a path from the point e to the point f), in which the plunge cutting tool 2A and the press-die material W are relatively moved in a direction orthogonal to the axial direction of the tool body 3 to retreat the plunge cutting tool 2A from the press-die material W; and a return step (a path from the point f to the point h via the point g), in which the plunge cutting tool 2A and the press-die material W are relatively moved in the axial direction of the tool body 3 and in a direction orthogonal thereto so that the plunge cutting tool 2A returns to the original position thereof.

During the pierce-cutter plunge cutting step (the path from the point a to the point c), after the plunge cutting tool 2A is relatively moved in the axial direction of the tool body 3 to machine the effective blade B1 (the path from the point a to the point b), the plunge cutting tool 2A and the press-die material W are relatively moved in the axial direction of the tool body 3 and in a direction orthogonal to the axial direction to machine the blade relief-clearance area B2 (the path from the point b to the point c).

Incidentally, in FIG. 6, the reference signs respectively represent:

A: machining start height;
D: retreat amount;
E: machining margin (machining allowance from the press-die material); and
F: clearance (distance from the secondary relief-clearance area C to an interfering object).

Figure 7:
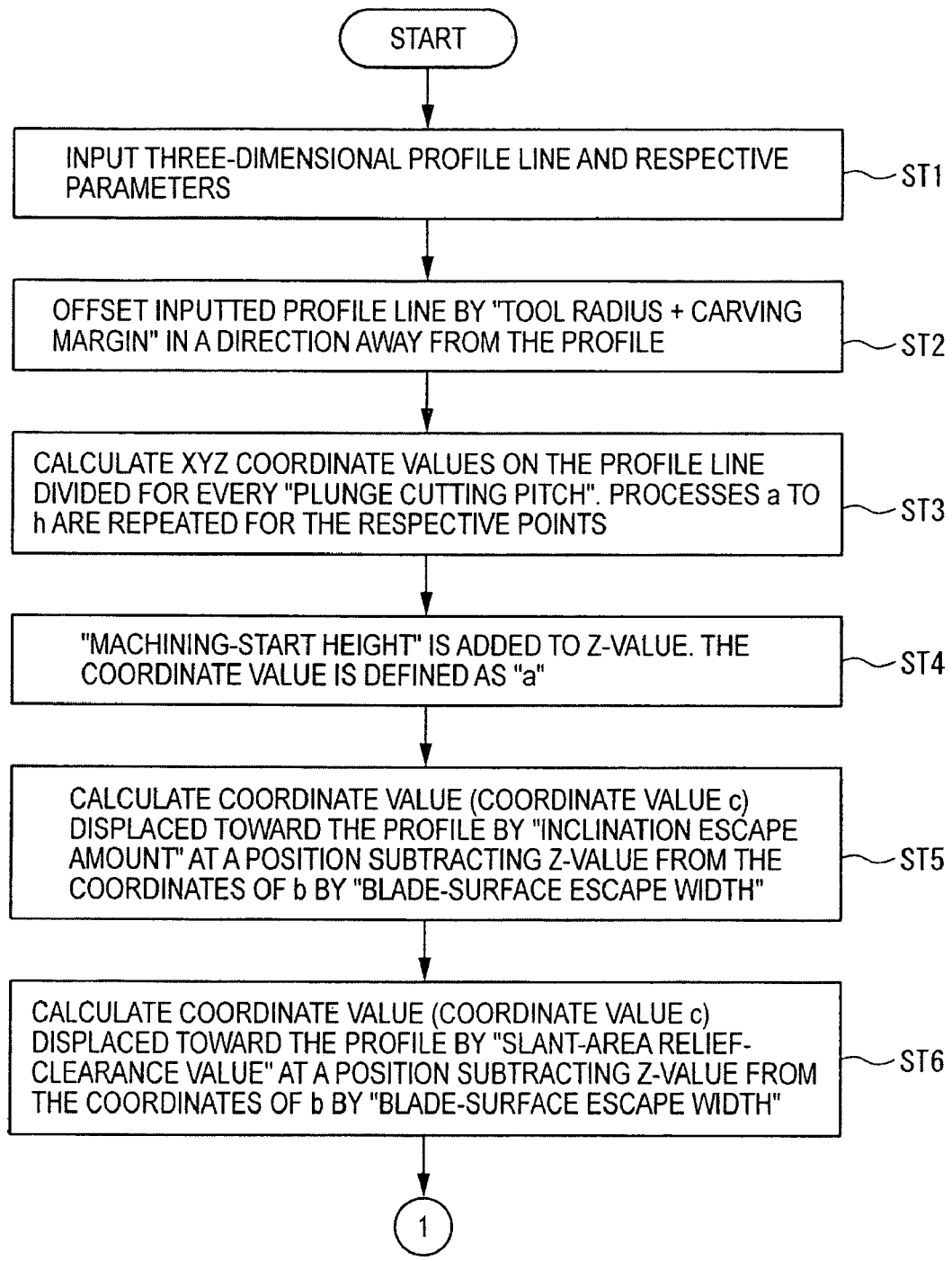
FIG. 7 is a flow chart (first half) for obtaining the machining path in the above embodiment.
Figure 8:
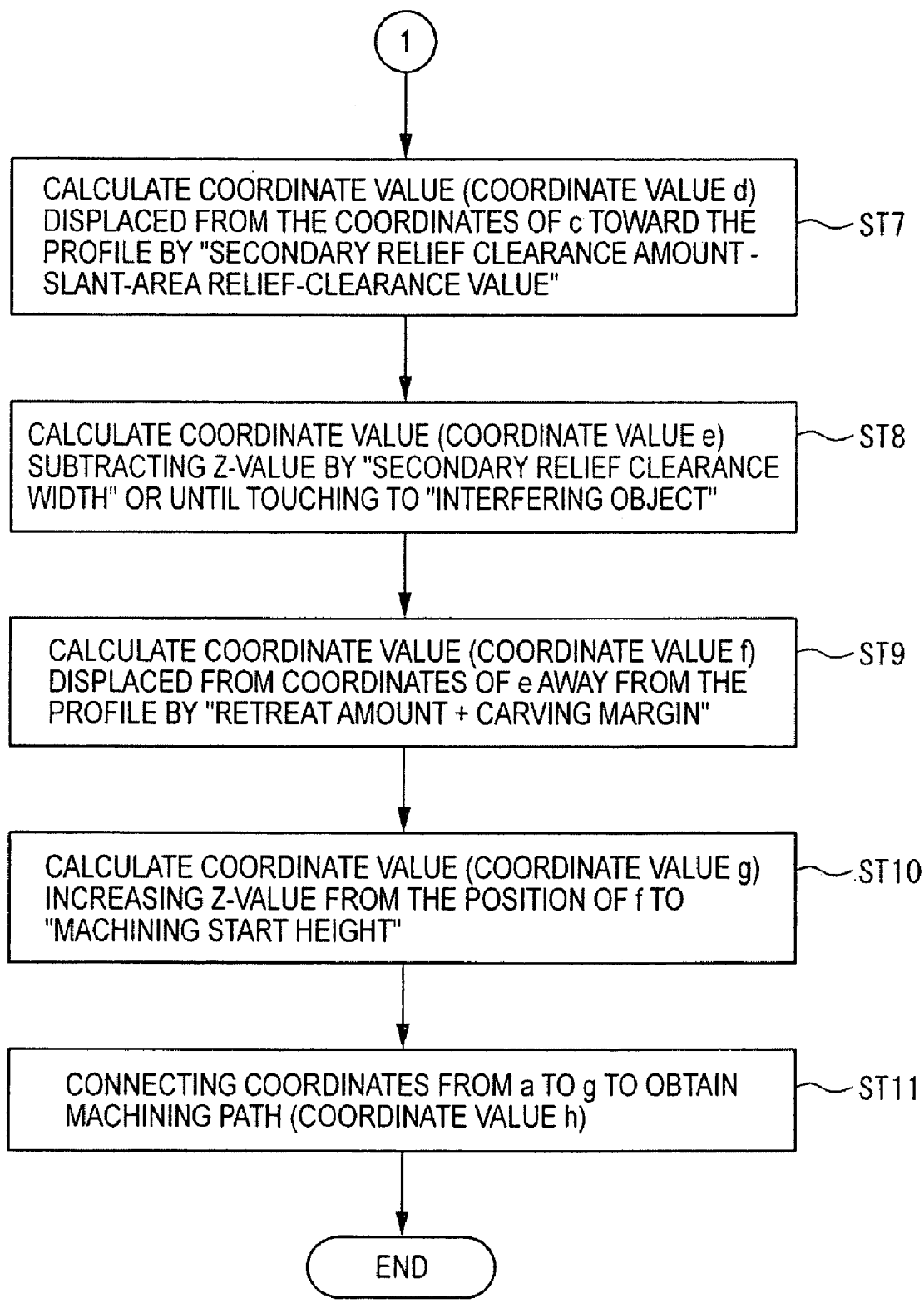
FIG. 8 is a flow chart (second half) for obtaining the machining path in the above embodiment.
Figure 11:
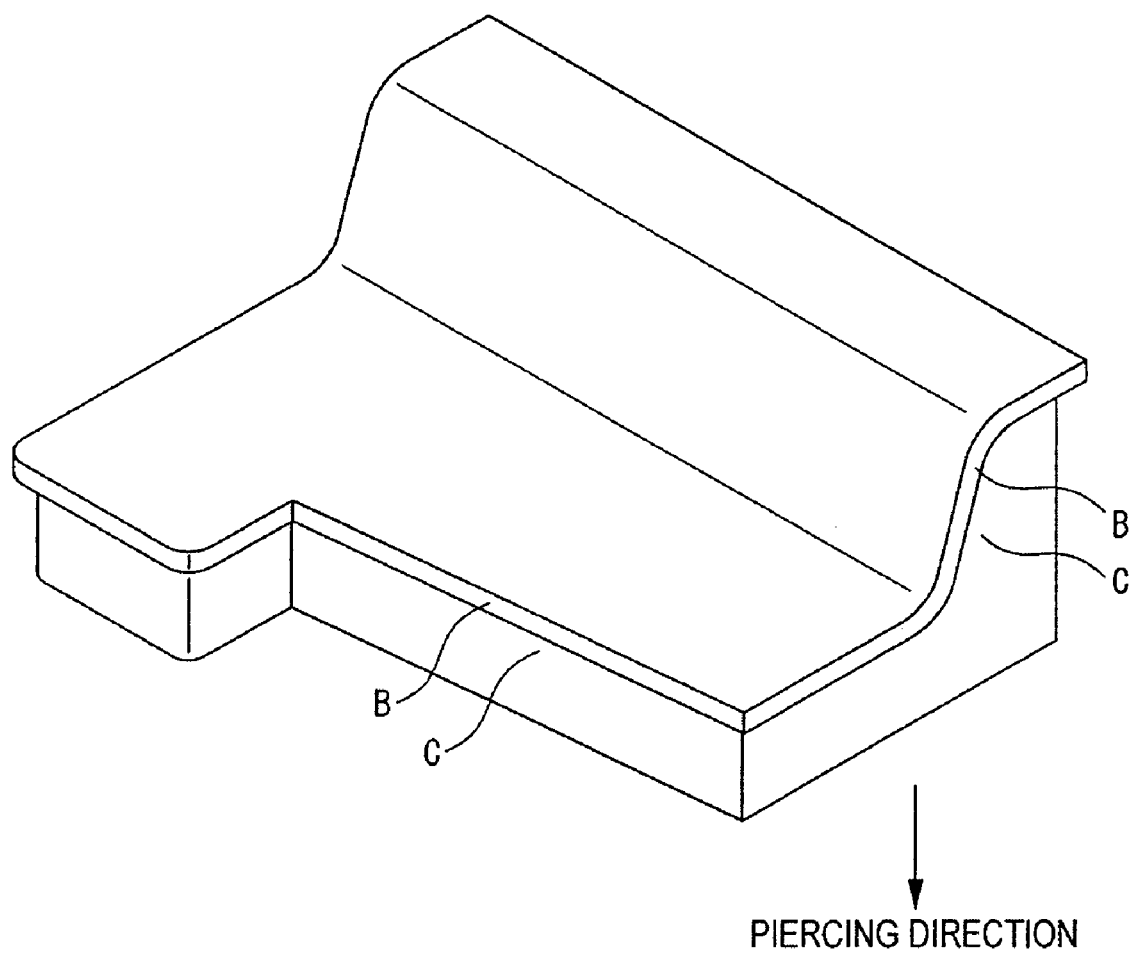
FIG. 11 is a perspective view showing an example of a press die to be machined.
Figure 12:
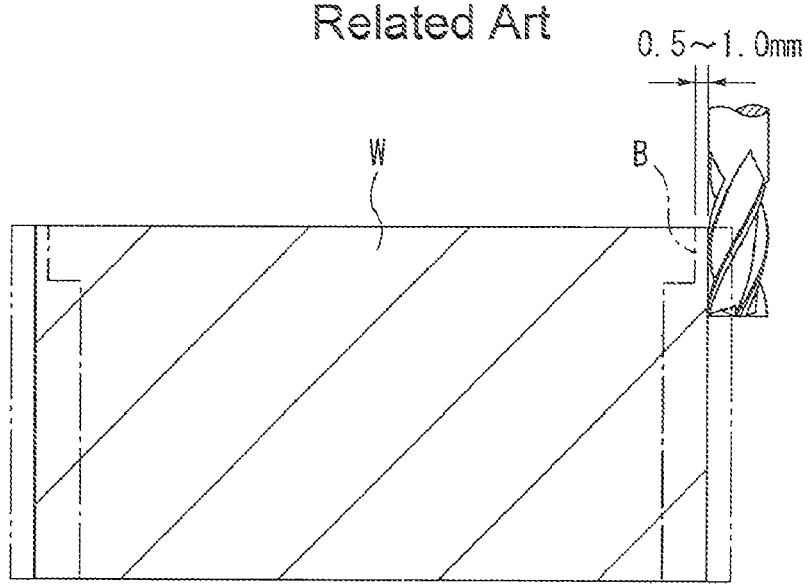
FIG. 12 is an illustration showing a coarse machining of a pierce cutter.
Figure 13:
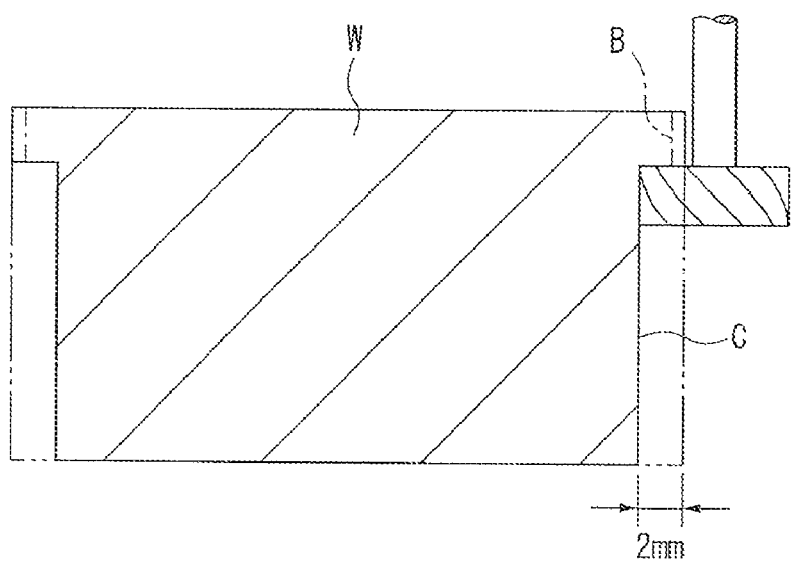
FIG. 13 is an illustration showing a coarse machining of a secondary relief-clearance area.
Figure 14:
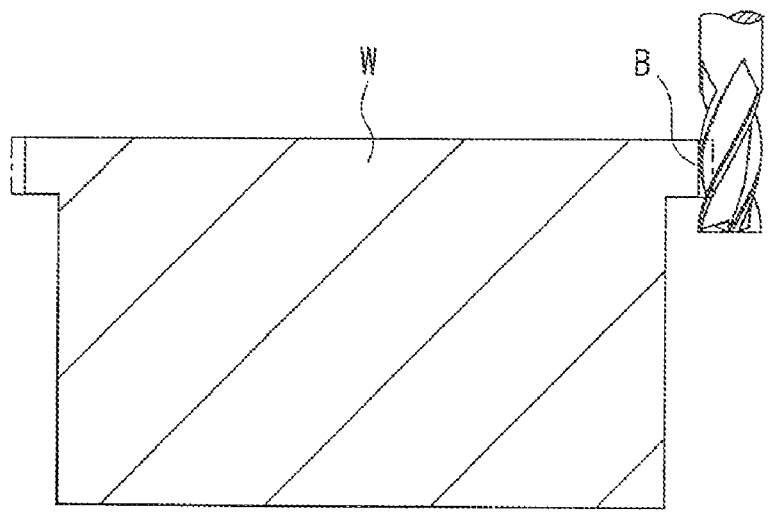
FIG. 14 is an illustration showing a finish machining of the pierce cutter.
Figure 15:
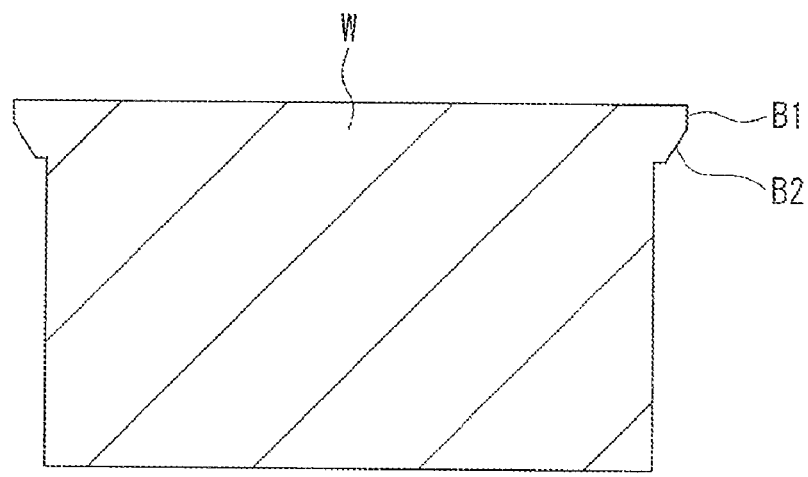
FIG. 15 is an illustration showing a machining of a blade relief-clearance area of the pierce cutter.

In order to obtain the machining path, the process follows the steps shown in the flow charts of FIGS. 7 and 8. Incidentally, ST represents a "step" in the following explanation.

In ST1, a three-dimensional profile line and respective parameters are inputted. The three-dimensional profile line is, as shown in FIG. 6, a profile line PFL of the pierce cutter B of the press die. The parameters are A, B(B1, B2, B3), C(C1), D, E, F shown in FIG. 6 and the like. The data is stored in the profile data storage 52 of the machining controller 51.

In ST2, the inputted profile line is three-dimensionally offset in a direction away from the profile by an amount of "tool radius+carving margin".

In ST3, XYZ coordinate values on the profile line divided for "plunge cutting pitch" are calculated. In other words, the XYZ coordinate values of the respective points on the profile line on which the plunge cutting tool 2A moves by the predetermined pitch along the profile of the pierce cutter B are calculated. Then, the process for calculating the machining path from the point a to the point h is repeated for the respective points.

In ST4, the "machining start height A" is added to Z-value. The coordinate value is defined as "a".

In ST5, the Z-value subtracting "machining start height A+effective blade B1 (width dimension)" from the coordinates a is calculated. However, the "effective blade B1 (width dimension)" is retained in a direction normal to the profile surface where the profile is slanted. The coordinate value is defined as "b".

In ST6, at a position subtracting the Z-value corresponding to "blade relief-clearance area B2 (width dimension)" from the coordinates b, a coordinate value shifted toward the profile by the amount of "slant-area relief-clearance value B3" is calculated. The coordinate value is defined as "c".

In ST7, a coordinate value displaced from the coordinates c toward the profile by the amount of "secondary escape amount C1−slant-area relief-clearance value B3" is calculated. The coordinate value is defined as "d".

In ST8, a coordinate value subtracting the Z-value corresponding to the amount of "width dimension of the secondary relief-clearance area C" or an amount before touching the "interfering object" from the coordinates d is calculated. The coordinate value is defined as "e".

In ST9, a coordinate value displaced from the coordinates e by an amount corresponding to "retreat amount+carving margin" in a direction away from the profile is calculated. The coordinate value is defined as "f".

In ST10, a coordinate value increasing the Z-value from the position of f to the "machining start height" is calculated. The coordinate value is defined as "g". Then, the machining path connecting the points a, b, c, d, e, f, g and h(a) is calculated. Thus calculated machining path data is stored in the machining path data storage 53.

Advantages of Embodiment (1) In the coarse machining step, when the relative movement step, in which the plunge cutting tool 2A is relatively moved along the profile of the pierce cutter B while rotating the plunge cutting tool 2A with the axis of the tool body 3 of the plunge cutting tool 2A being approximately in parallel to the surface of the pierce cutter B is to be conducted, the plunge cutting tool 2A is moved along the machining path connecting the points a, b, c, d, e, f, g and h(a) each time the plunge cutting tool 2A is moved by the predetermined pitch. Accordingly, the process that conventionally required two steps can be conducted in one step.

(2) At this time, the plunge cutting tool 2A is not only relatively moved along the profile of the pierce cutter B while being rotated but also is relatively moved in the axial direction of the tool body 3 along the profile of the pierce cutter B and the secondary relief-clearance area C in the piercing direction, the flexure of the tool body 3 can be reduced. Accordingly, cutting amount can be increased, thus contributing significant reduction of the machining time.

(3) Further, the plunge cutting tool 2A provided with the at least one edge portion 4B protruding from the outer circumference of the tool body 3 at an end of the outer circumference of the tool body 3, the edge portion 4B being capable of carving during rotation around the axis of the tool body 3 and axial movement of the tool body 3, is used for machining. Accordingly, carving resistance can be lessened as compared with carving using a flat-end mill.

(4) During the plunge cutting step, the plunge cutting tool 2A is relatively moved in the axial direction of the tool body 3 to machine the pierce cutter B and is relatively moved in the direction orthogonal to the axial direction of the tool body 3 to cut the secondary relief-clearance area C with the plunge cutting tool 2A. Subsequently, the plunge cutting tool 2A is relatively moved in the axial direction of the tool body 3 to machine the secondary relief-clearance area C. Accordingly, the machining from the pierce cutter B to the secondary relief-clearance area C can be successively conducted.

(5) In the pierce-cutter plunge cutting step, after the plunge cutting tool 2A is relatively moved in the axial direction of the tool body 3 to machine the effective blade B1, the plunge cutting tool 2A is relatively moved in the axial direction of the tool body 3 and also is moved in the direction orthogonal to the axial direction to machine the blade relief-clearance area B2. Accordingly, the effective blade B1 and the blade relief-clearance area B2 can be successively machined on the pierce cutter B of the press-die material W. Hence, the number of the machining steps can be reduced and time reduction becomes possible. In a conventional arrangement, since the machining of the blade relief-clearance area B2 is conducted with a grinder and the like by an operator, work efficiency is extremely low. However, according to the present embodiment, the above disadvantage can also be significantly mitigated.

(6) Since the pierce cutter B machined during the plunge cutting step is finished with the flat-end mill 2B, the shear surface of the punched product can be favorably finished.

(7) The controller 50 executes: the relative movement step, in which the plunge cutting tool 2A and the press-die material W are relatively moved along the profile of the pierce cutter B while the plunge cutting tool 2A is rotated; and the plunge cutting step, in which the plunge cutting tool 2A and the press-die material W are relatively moved in the axial direction of the tool body 3 along the profile of the pierce cutter B and the secondary relief-clearance area C in the piercing direction for each relative movement of the predetermined pitch. Accordingly, significant reduction of machining time can be attained and, since it is not required for an operator to relatively move the plunge cutting tool 2A and the press-die material W, the machining process can be conducted without skilled work and with safety.

(8) Since the press-die material W is supported on the workpiece mount face 13 of the Y-slider 14 via the legs 15 of a predetermined height, the bottom side of the press-die material W can also be carved. At this time, by inputting the height information of the legs 15 in advance, the controller 50 executes the relative movement step and the plunge cutting step considering the height information of the legs 15, so that predetermined machining can be conducted on all of the sides without requiring additional effort.

Modifications

The scope of the present invention is not limited to the above embodiment, but includes modification, improvements and the like as long as an object of the invention can be achieved.

Though the plunge cutting tool 2A is retreated in a direction away from the press-die material W and is returned to the original position after the plunge cutting tool 2A is lowered to machine the effective blade B1, the blade relief-clearance area B2 and the secondary relief-clearance area C, i.e. the machining step is conducted only when the plunge cutting tool 2A is lowered in the path shown in FIG. 9A (unidirectional machining method), an alternative arrangement is possible. In other words, as long as the machining is conducted while the plunge cutting tool 2A and the press-die material W are relatively moved along the profile of the pierce cutter B and the secondary relief-clearance area C in the piercing direction, the machining operation may be conducted during both upward and downward movements.

For instance, in FIG. 9B, the plunge cutting tool 2A is moved forward (the path from the point a to the point e) along the profile of the pierce cutter B and the secondary relief-clearance area C in the piercing direction and is moved to the front or depth side in the figure at the point e. Subsequently, the plunge cutting tool 2A is moved backward (a path from the point e to the point a) along the profile of the pierce cutter B and the secondary relief-clearance area C in the piercing direction (reciprocatory machining method).

In FIG. 9C, the plunge cutting tool 2A is moved forward in the portion (the path from the point a to the point b) of the effective blade B1 of the pierce cutter B and is moved to the near or far side in the figure at the point b. Subsequently, after the plunge cutting tool 2A is moved backward (the path from the point b to the point a) along the profile of the effective blade B1, the operation shown in FIG. 9A is conducted (quick unidirectional machining method).

In FIG. 9D, before and after the reciprocating movement in FIG. 9B, the plunge cutting tool 2A is vertically reciprocated along the portion of the effective blade B1 of the pierce cutter B (moved to the front or depth side in the figure during backward movement). During the reciprocating movement, machining operation (quick reciprocatory machining method) is conducted.

Though an arrangement in which the machining tool 2A and the flat-end mill 2B are capable of moving in the Y and Z directions and the X-slider 14 on which the press-die material W is placed is capable of moving in the X-direction is exemplified in the above embodiment, alternative arrangement is possible. For instance, the machining tool 2A and the flat-end mill 2B may be adapted for a movement in the X, Y and Z directions or, alternatively, the table on which the press-die material W is placed or the like may be arranged movably in the X, Y and Z directions. With regard to the movement axes, it is only required that one of the machining tool and the table is capable of moving in at least one of the X, Y and Z directions and the other of the machining tool and the table is capable of moving in the rest of the directions.

Though the plunge cutting tool 2A having the tool body 3 detachably attached to the spindle head 34 and the blade tip 4 attached to an end of the tool body 3 is used in the above embodiment, it is not required that two components are used. Specifically, no limitation is posed on the shape of the machining tool as long as the machining tool has the edge portion 4B that projects from the outer circumference of the tool body 3 and capable of carving when being rotated around the axis of the tool body 3 and when being moved in the axial direction of the tool body 3.

Further, the shape of the blade tip 4 is also not limited to the configuration of the above embodiment, but may be configured as shown in FIGS. 10A to 10D.

FIGS. 10A and 10B show a rhombus-shaped blade tip 4. In FIG. 10A, the blade tip 4 is attached to the tool body 3 so that the diagonal lines extend parallel and orthogonal to the axis line of the tool body 3. In FIG. 10B, the blade tip 4 is attached to the tool body 3 so that one side of the diamond extends orthogonal to the axis line of the tool body 3.

FIG. 10C shows a rectangular blade tip 4. The blade tip 4 is attached so that one side of the rectangular shape extends orthogonal to the axis line of the tool body 3.

FIG. 10D shows a disc-shaped blade tip 4 having a blade on an outer circumference thereof.

In the embodiment, during the pierce-cutter plunge cutting step, after the plunge cutting tool 2A is relatively moved in the axial direction of the tool body 3 to machine the effective blade B1, the plunge cutting tool 2A is relatively moved in the axial direction of the tool body 3 and also is moved in the direction orthogonal to the axial direction to machine the blade relief-clearance area B2. However, the blade relief-clearance area B2 may not be necessarily provided.

In the embodiment, the pierce cutter B and the secondary relief-clearance area C are initially coarsely machined using the plunge cutting tool 2A on the outer circumference of the press-die material W and the pierce cutter B is subjected to finish-machining using the flat-end mill 2B. However, when there is a great carving margin between the profile of the press-die material W and the pierce cutter B, a pre-machining in which the profile of the press-die material W is cut with a constant thickness before the vertical coarse machining may be conducted for reducing the carving margin during the coarse machining step, thereby efficiently conducting the coarse machining step.

Though the machining program generator 54 for generating the machining program is provided on the controller 50 of the machining apparatus in the embodiment, the machining program generator 54 for generating the machining program may be provided independently from the machining apparatus.

In this case, by generating the machining program at the machining program generator 54 in advance and installing the generated machining program in the machining apparatus having the controller 50, since the operation of the machining apparatus is controlled based on the machining program, the designed press die can be automatically machined.

Specific arrangement and steps in implementing the present invention can be modified as long as an object of the invention can be achieved.

The priority application Number JP2007-304766 upon which this patent application is based is hereby incorporated by reference.

What is claimed is:

1. A machining apparatus for machining a press die having a pierce cutter with a peripheral profile and a side surface, the press die also having a secondary relief-clearance area recessed inward relative to the profile and side surface of the pierce cutter, the pierce cutter and the secondary relief-clearance area being arranged one behind the other in a piercing direction in which the press die is actuatable to pierce a workpiece when the press die is in a press, the apparatus comprising:

a three-dimensional drive mechanism including a machining tool and a spindle head for rotatably supporting the machining tool, the three-dimensional drive mechanism relatively moving the spindle head and a press-die material three-dimensionally; and a controller for controlling an operation of the three-dimensional drive mechanism, wherein the machining tool has a tool body and at least one edge portion provided on an outer circumference of an end of the tool body, the at least one edge portion protruding from the outer circumference of the tool body and being capable of carving while rotating around an axis of the tool body and moving in an axial direction of the tool body, and the controller has a unit for executing: a relative movement step, in which the machining tool and the press-die material are relatively moved along the profile of the pierce cutter while rotating the machining tool with the axis of the tool body of the machining tool being approximately parallel to the side surface of the pierce cutter; and a plunge cutting step for cutting the pierce cutter and the secondary relief-clearance area, in which the machining tool and the press-die material are relatively moved in the axial direction of the tool body along a shape of the pierce cutter and the secondary relief-clearance area in the piercing direction each time the machining tool and the press-die material are relatively moved along the profile of the pierce cutter by a predetermined pitch.

2. The machining apparatus of a press die according to claim 1, wherein the press-die material is supported on a workpiece mount face via a leg of a predetermined height, and the controller includes a unit for executing the relative movement step and the plunge cutting step considering height information of the leg.

* * * * *